Patented May 5, 1953

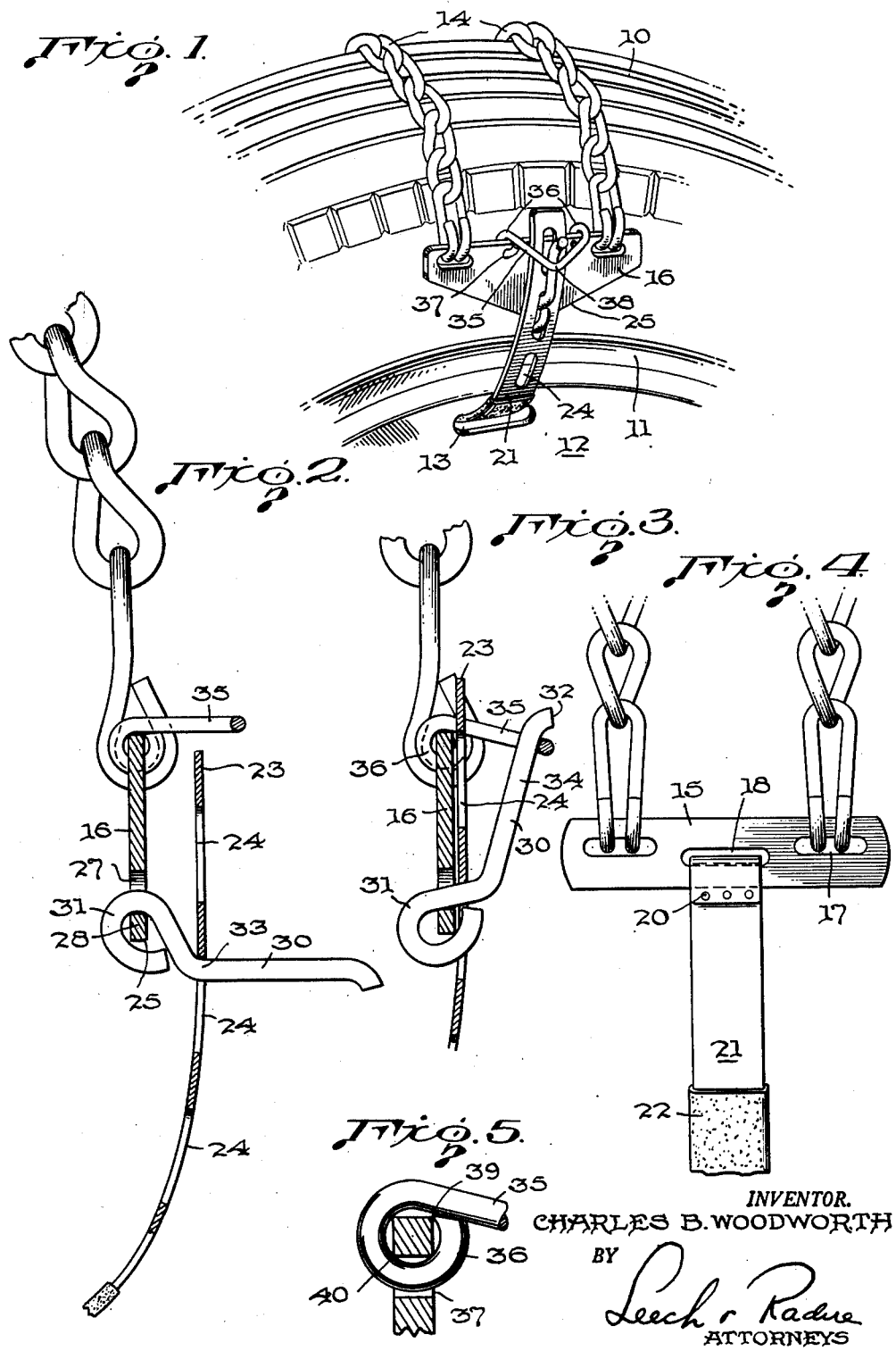

2,637,364

UNITED STATES PATENT OFFICE 2,637,364

METAL STRAP TIRE CHAIN

Charles B. Woodworth, Binghamton, N. Y.

Application January 5, 1951, Serial No. 204,515

6 Claims. (Cl. 152—237)

This invention relates to non-skid devices for wheels of automotive vehicles, and more particularly to what are commonly known as emergency anti-skid devices or jiffy chains, a number of which may be individually applied to each rear wheel to improve traction and braking on ice or slippery snow.

It is a general object of the present invention to provide a novel and improved anti-skid device for use on automotive vehicle wheels.

More specifically, it is an object of the invention to provide improved strap fastening and tightening means in an emergency anti-skid device having suitable traction means to be extended about the tire portion of the wheel and a relatively rigid metal strap adapted to pass through a narrow slot in the wheel disc to connect the ends of the traction means and hold the device on the wheel.

An important object of the invention consists in the provision of novel connecting means whereby the free end of the strap which is normally passed through the hole in the wheel disc may be secured to one end of the traction means and provide not only a secure attachment but means to facilitate the tightening of the whole assembly about the wheel and tire.

One of the important features of the invention consists in the provision of a lever pivoted to one end of the traction device and adapted to be passed through a hole in the metal strap and to offer force multiplying effects whereby strap tightening can better be achieved.

Another important feature consists in the combination with the lever just defined of locking means for holding the end thereof in strap retaining position and having friction or like devices for retaining it as adjusted.

Other and further features and objects of the invention will be more apparent to those skilled in the art upon a consideration of the accompanying drawing and following specification, wherein is disclosed a single exemplary embodiment of the invention, with the understanding that such changes and modifications may be made therein as fall within the scope of the appended claims without departing from the spirit of the invention.

In said drawings:

Fig. 1 is a perspective view of a portion of a wheel and tire shown equipped with an emergency traction device constructed in accordance with the present invention;

Fig. 2 is a fragmentary elevation partially in longitudinal section and on an enlarged scale showing the connecting means for the strap end in an early stage of the fastening operation;

Fig. 3 is a view similar to Fig. 2 but showing the parts in a fully fastened condition;

Fig. 4 is an elevation of the inner ends of the strap and the anti-skid devices and the connecting spreader plate therefor; and Fig. 5 is a fragmentary section on an enlarged scale through one of the spreader plates showing the mounting of the locking stirrup.

In the field of anti-skid devices for use on wheels of automotive vehicles development has in general been in two directions, the first comprising what are known as full chains, consisting of annular side chains and connecting cross chains. With these, difficulty is often experienced in wrapping them about the tire circumferentially and fastening the ends, since the wheel must be passed over the chain before the ends can be fastened. To circumvent the fastening difficulties and to permit chains to be applied in an emergency such as when a vehicle is caught in a sudden snow or on a slippery stretch, devices commonly known as emergency individual or jiffy chains have been developed. These may comprise one or more traction chains or devices of a suitable nature to extend transversely of the tire tread with their inner ends arranged to be connected by strap means having attaching means which can be engaged after the whole is in place. With spoked wheels no difficulty was experienced in applying these, but with the advent of disc wheels the difficulty became greater, since the manufacturers did not see fit to leave sufficiently large openings near the rim for the passage of the attaching straps. As tires became bigger and fenders more deeply dished, the difficulty of passing the end of the strap outwardly through such a narrow slot became too great and this type of device lost popularity.

In accordance with the present invention difficulties reviewed above have been overcome by the use of a rigid metal strap, which can have much greater strength than the fabric straps and with much less dimensions, so that the rather limited slots provided by some manufacturers can be easily entered by the strap. Furthermore, by making the strap rigid, the free end can be passed over the top of the tire and through the slot from the rear so that the fastening means can be on the outer side and no difficulty will be experienced in the assembly. In accordance with the present invention, one of the important features is the use of strap fastening means permitting the entire free end of the strap to be unimpeded by any devices changing its width, thickness or shape.

Referring to the drawings, and first to Fig. 1, there is shown a section of conventional automotive wheel comprising a tire 10, rim 11, and wheel disc 12 provided with a plurality of narrow circumferentially disposed slots 13. The emergency traction device of the present invention is shown applied thereto and comprising a suitable set of anti-skid or traction elements 14, here comprising a pair of tire chains which are arranged to extend transversely of the tire tread and having their ends respectively attached to back spreader 15 and outer spreader 16. Any desired number or type of traction device may be used. Each spreader consists of a heavy metal plate suitably provided with spaced slots for attaching the end links of the chains. The back spreader is a straight bar having slots 17 for chains and an intermediate slot 18 for the mounting strap.

This mounting strap comprises a length of narrow steel strip of requisite strength to resist the stress of the traction devices. One end thereof is passed through slot 18, folded down and suitably attached as by spot welding at 20 to the main reach of the strap 21.

The strap is suitably curved to generally conform to the rim shape and is of such natural rigidity that the free end may be passed over the tread of the tire and manipulated by the more available outer portion to pass outwardly through the rim slot 13, which has been selected. To protect the finish of the vehicle wheel particularly adjacent the slot walls, a suitable protective covering 22 is attached to the intermediate portion of the strap. This can be braided or wound fabric, but preferably comprises a resilient rubber sleeve.

The free end section 23 of strap 21 is straight, entirely unimpeded and of constant width and thickness throughout, as clearly indicated in the several figures of the drawing. This facilitates its passage through selected slot 13 in the wheel disc. This end section is perforated by a series of elongated holes 24 disposed in alignment along the axis thereof.

The outer spreader plate 16 is preferably of flat triangular shape, with the point 25 facing toward the rim of the wheel. Adjacent this point the plate is provided with a hole 27, leaving a portion 28, Fig. 2, serving as a fulcrum for lever 30, which is attached thereto by having its inner end formed into a closed loop 31 passing through hole 27. The lever is constructed from heavy wire or rod and the loop is elongated or oval and the main portion of the lever extends therefrom at an angle to the radial whereby the lever can be rotated to a position nearly parallel to the face of the plate. When the lever is passed through a hole 24 in the strap, Fig. 2, it provides a mechanical advantage of about two to one, since pressure on end 32 applies effort at the strap engaging point 33 about two-thirds of the distance between the end and the fulcrum. This permits the person attaching the device to draw the strap tight with but little expenditure of effort and thus insure that the assembly be substantially noiseless in operation and not rattle and clank due to insecure fastenings. The outer end 32 of the lever is bent downward through an arc of substantially 75° for a purpose which will now appear.

It is desirable to hold the lever in a locked position approximating 80° from the position in Fig. 2, as shown in Fig. 3. Under these conditions the strap engages the lever close against the face of plate 16 because of the relation of the loop and straight parts and exerts but little unlocking effort. This permits the use of a simple wire stirrup locking means 35, having looped ends 36 passing through holes 37 near the upper edge of plate 16 and straddling the center line thereof. These loops are connected by straight sections meeting at the apex 38. The stirrup is rotatable about the edge of the plate and can be swung into locking position over the end of the lever, as seen in Fig. 3. Curved end 32 of lever 30 prevents the stirrup from releasing it under any condition, but can be released easily by pressing the lever down more closely against the plate and swinging the stirrup upwardly.

As shown in Fig. 5, the eyes of the stirrup are substantially circular and fit tightly against the plate edges 39 and against the corresponding edges 40 of the holes through which the eyes pass. Adequate friction can thus be provided to hold the loop in any adjusted position, or if the eyes are made non-circular it is a simple matter to provide for holding the stirrup in the desired locking position and also in some desired unlocking position. A spring might be used for holding it in locking position, or the inner surface of the eyes might be serrated for frictional engagement with the edges of the hole and plate. In any event some biasing or friction means is made use of to maintain the locking stirrup in the adjusted position to hold the lever locked.

In order to accommodate various sized tires and wheel assemblies and to compensate for changes in the tire tread due to wear, several holes 24 are provided in strap 21 for selection by the user. If any but the outermost hole is used the strap must be passed under the stirrup. This permits the stirrup to engage the locking lever above the strap after it has been used to tension the assembly.

The lever and its associated locking stirrup provide a simple, cheap and effective mechanism not only for tightening the traction devices about the tire, but for providing a secure and adequate lock to hold the assembly in position against all the strains placed on it in the normal operation thereof.

I claim:

1. An anti-skid device for a vehicle wheel having a tire, a rim and a hub, comprising in combination, traction means adapted to extend over the tread of the tire, a relatively stiff metal strap having one of its ends connected to one end of said means and being adapted to extend across the wheel rim on the hub side thereof, the opposite end section of said strap being of suitable width and thickness to facilitate passage through the wheel and having longitudinally spaced openings therethrough, a plate, the opposite end of said traction means being connected to one edge of said plate, a unitary lever hinged on and adjacent the opposite edge of said plate and adapted to be directly passed through a selected one of said strap openings and rotated toward the face of the plate for tightening the assembly on the wheel, and locking means carried by said plate and engageable over the lever to hold it in tightened position, said last mentioned means being positioned to receive the end of the strap when the lever is in an opening remote from the strap end.

2. An anti-skid device for a vehicle wheel having a tire, a rim and a disc having openings therethrough, comprising in combination, a traction assembly adapted to extend over the tread of the tire, a relatively stiff metal strap connected by one of its ends to one end of said assembly and adapted to extend through an opening above the wheel rim, the free end section of said strap being of such uniform width and thickness as to facilitate passage through a disc opening and having a series of longitudinally spaced holes therethrough, a unitary lever hinged to the opposite end of said assembly and adapted to be directly passed through a selected one of said strap holes and rotated toward the tire for tightening the device on the wheel, and locking means on said assembly positioned to receive the strap end and engageable with and over the lever to hold it in tightened position.

3. An anti-skid device for a vehicle wheel having a tire, a rim and a perforated disc, comprising in combination, a pair of suitable traction means adapted to extend over the tread of the tire, a spreader plate for each end of said pair and attached to and spacing said traction means, a relatively stiff metal strap connected by one of its ends to one of said plates and adapted to extend through the wheel and about the rim, the free end section of said strap being of substantially uniform width and thickness to facilitate passage through the wheel and having a series of aligned holes therethrough, a unitary lever having an eye passing through an opening near the free edge of said other plate to hinge it thereto and adapted to be directly passed through one of said strap openings and rotated toward the face of the plate for tightening the assembly on the wheel, and a locking stirrup hinged to the opposite edge of the said other plate in alignment with the lever and engageable over the latter to hold it in tightened position, the strap end being adapted to pass through said stirrup in certain adjusted positions of the strap on the lever.

4. The device of claim 3 in which the stirrup is of sufficient width to straddle the free end section of the strap and of sufficient depth to accommodate both the strap and the lever.

5. The device of claim 3 in which means is provided to retain the stirrup in engaged position over the said lever comprising non-circular eyes on said stirrup surrounding non-circular portions of said other plate.

6. The anti-skid device of claim 3 in which said lever has means intermediate its length to first engage and position said strap, the lever having a portion between said means and eye over which the strap may slide whereby the mechanical advantage of the lever is progressively increased as it is moved toward the tire.

CHARLES B. WOODWORTH.

References Cited in the file of this patent

UNITED STATES PATENTS

| Number | Name | Date |
| --- | --- | --- |
| 969,425 | Traver | Sept. 6, 1910 |
| 1,393,986 | Wallace and Twitchell | Oct. 18, 1921 |
| 1,585,955 | Willis | May 25, 1926 |
| 2,420,804 | Wenzel | May 20, 1947 |
| 2,461,737 | Huffman et al. | Feb. 15, 1949 |